April 9, 1957   K. E. BRENDEN ET AL   2,788,182
AIRCRAFT WING AND AILERON CONTROLS
Filed Dec. 8, 1952   3 Sheets-Sheet 1

INVENTORS.
KERMIT E. BRENDEN
EDWARD M. TOBIN
BY
Reynolds, Beach & Christensen
ATTORNEYS April 9, 1957  K. E. BRENDEN ET AL  2,788,182
AIRCRAFT WING AND AILERON CONTROLS
Filed Dec. 8, 1952  3 Sheets-Sheet 2

INVENTORS.
KERMIT E. BRENDEN
EDWARD M. TOBIN
BY
Reynolds, Beach & Christensen
ATTORNEYS April 9, 1957 K. E. BRENDEN ET AL 2,788,182
AIRCRAFT WING AND AILERON CONTROLS
Filed Dec. 8, 1952 3 Sheets-Sheet 3

INVENTORS.
KERMIT E. BRENDEN
EDWARD M. TOBIN
BY
Reynolds, Beach & Christensen
ATTORNEYS

United States Patent Office 2,788,182
Patented Apr. 9, 1957

2,788,182

AIRCRAFT WING AND AILERON CONTROLS

Kermit E. Brenden and Edward M. Tobin, Seattle, Wash., assignors to Boeing Airplane Company, Seattle, Wash., a corporation of Delaware Application December 8, 1952, Serial No. 324,724

11 Claims. (Cl. 244—48)

This invention relates to controls for aircraft and more particularly to coordinated wing and aileron control mechanism especially suitable for use in guided missiles.

An object of the invention is to provide aileron controls in a wing structure which is tiltable about a transverse axis relative to the aircraft fuselage.

More specifically, an object is to provide control mechanism for tilting the wings relative to the fuselage at will without the ailerons being tilted appreciably relative to the wings. Alternatively the ailerons can be swung differentially to provide rolling control of the airplane in any tilted position of the wings relative to the fuselage. In fact, the tilt of the wings relative to the fuselage may be altered if desired while the ailerons are swung differentially, and such tilt of the wings will not appreciably affect the differential relationship of the ailerons or the angular relationship of either aileron relative to the wing even though the wings may be moved through a substantial angle relative to the fuselage.

To enable the foregoing objects to be accomplished, the aileron control and supporting mechanism is coordinated with the wing supporting mechanism, but the arrangement of these parts is quite compact, light and structurally efficient.

To enable the wings to be tilted relative to the fuselage, such wings are carried by opposite ends of a rotatable shaft, and the ailerons are interconnected by control mechanism including shafts rotatable in opposite directions about the same axis, which axis is spaced from the axis of the wing supporting shaft. Differential rotation of the aileron control shafts is effected by linkage bridging the wing supporting shaft and such aileron control shafts, and linkage for rotating the same is supported from the wing supporting shaft and swingable with such latter shaft as it is turned relative to the fuselage. As the wing supporting shaft is turned, the aileron control shafts will be displaced bodily but will not be rotated appreciably relative to the wings, so that the attitude of the ailerons relative to the wings remains unchanged.

As has been mentioned, the structure of the present invention is particularly suitable for use in guided missiles, and it is preferred that the ailerons extend laterally beyond the ends of the wings and form the wing tips, although the control mechanism of the invention is equally as well suited to actuate ailerons of the trailing edge type. While the wing tip type of ailerons is illustrated in the drawings, therefore, it will be understood that such showing is only representative.

Wings tiltable relative to a fuselage are particularly advantageous for use in flying missiles, and in such aircraft the wing loading is high, both because the weight to be carried is great and the missile travels fast. The parts, therefore, must be rugged, while it is desirable for them to be compact both to conserve such space as is available and to enable the missile to have a minimum size to reduce air resistance as far as possible.

Where ailerons are mounted on a tiltable wing it is evident that movement of the ailerons relative to the wing must not be effected by tilting of the wing relative to the fuselage, for otherwise every time the angle of incidence of the wing is changed the airplane would tend to roll in one direction or the other. Where controls are connected between a stationary structure and a tiltable structure it is customary to extend the controls substantially through the rotative axis of the tiltable member to eliminate the effect of such tilting on the controls. This arrangement in a guided missile has the disadvantage that it is difficult to provide support structure for tiltable wings which will coordinate accurately the tilting of the wings, be sufficiently rugged to carry to the fuselage the lift exerted on the wings, be of compact construction and still be hollow to enable control mechanism to pass through the wing supporting structure at substantially its axis of tilt. The disadvantages of such an arrangement are not present in the structure of the present invention.

Figure 1:
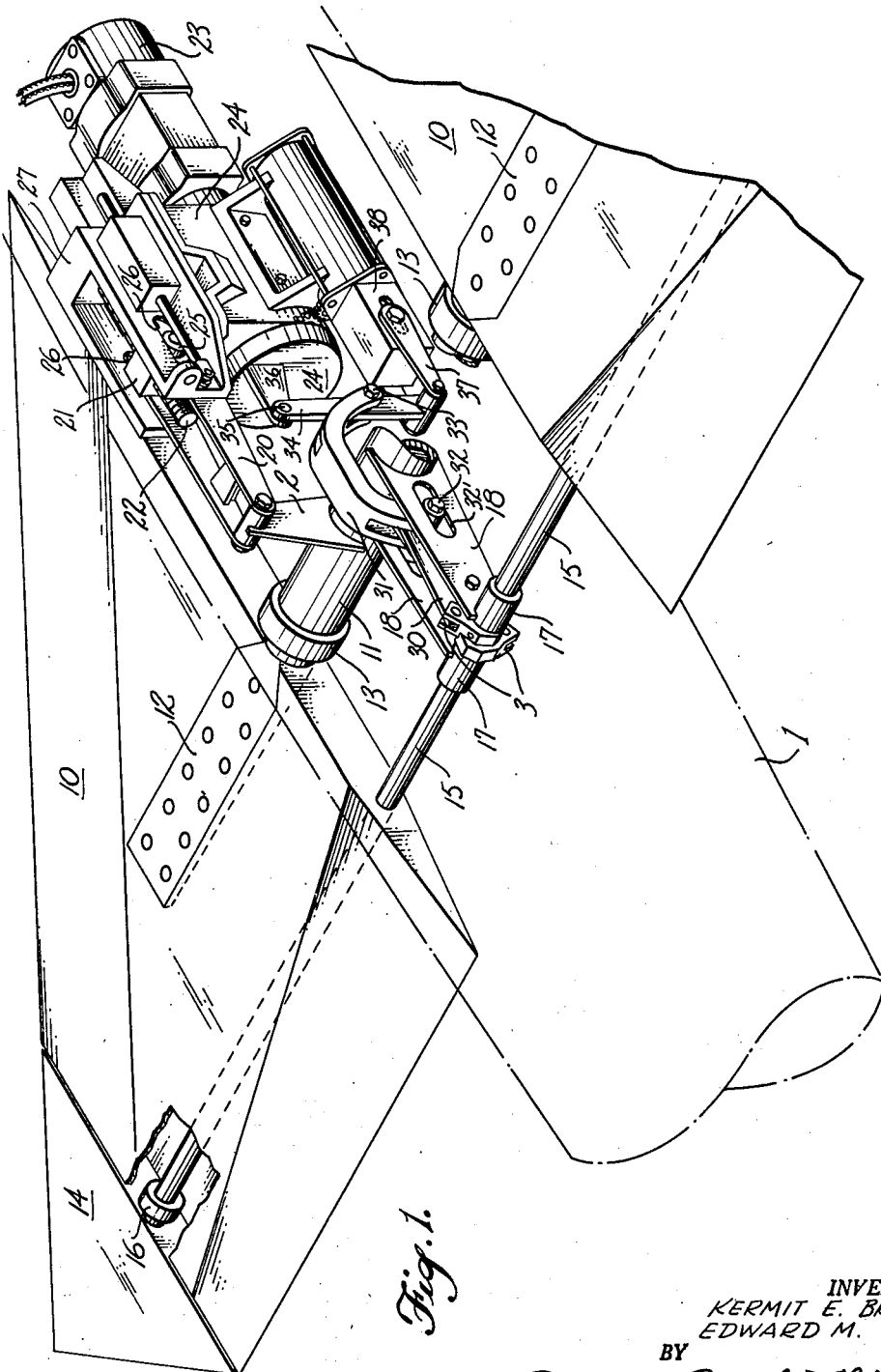
Figure 1 is a top perspective view of an aircraft wing and aileron assembly to which the control mechanism of the present invention is applied, the aircraft fuselage being shown in broken lines and parts of the wing structure being broken away.

In Figure 1 the fuselage 1 is shown in phantom, and the details of the structure integrating the wings 10 with the fuselage are not shown, because any suitable structure can be employed to provide a rigid and strong connection between the wings 10 while at the same time insuring precise coordination of their tilting relative to the fuselage. They are interconnected by a shaft 11 which may be hollow for lightness, yet its strength will not be impaired by the provision of apertures in its wall through which controls extend from the fuselage to its interior. Each end of shaft 11 carries a suitable fitting 12 which is integrated rigidly with the wing to transmit between the wing and shaft 11 high loads in bending, torsion and shear. Bearings 13, preferably of the antifriction type, secured in the fuselage, will enable shaft 11 to turn freely relative to the fuselage, while the wings and fuselage are interconnected through the shaft for mutual support.

Figure 4:
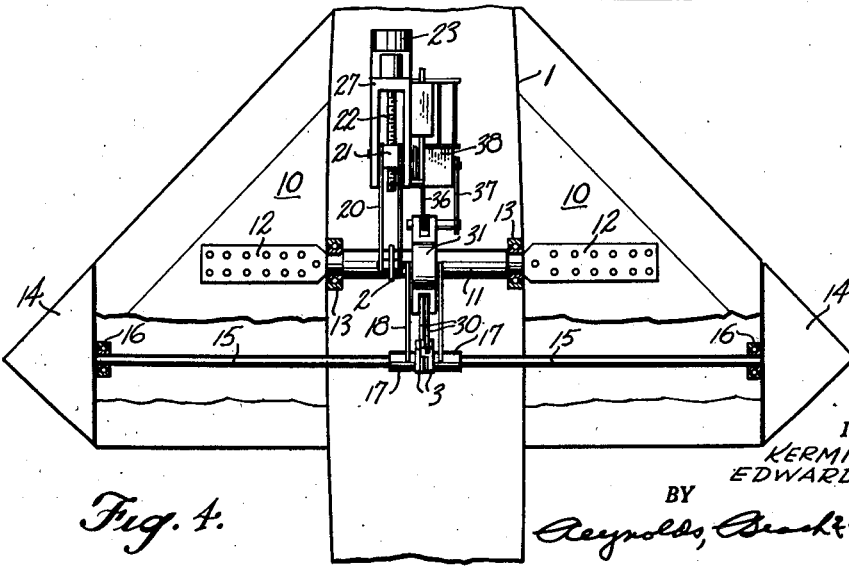
Figure 4 is a plan view of the wing, aileron and control mechanism, parts being broken away.

The wings 10 are shown as being of delta shape, the tip sections of which constitute ailerons 14. As shown best in Figure 4, such ailerons are preferably of isosceles triangular shape, and they are mounted to rotate about the altitude line of the triangle, but the principles of the control mechanism discussed hereafter may be utilized equally effectively for controlling ailerons of the trailing edge type. Where wings of delta shape are tiltable the axis of tilt should coincide approximately with the average center of lift position of the wing as a whole. As shown in Figure 4, such position is usually somewhat aft of the fore-and-aft center of the wing chord adjacent to the fuselage. The rotative axis of the ailerons, whether of the wing-tip type illustrated or of the trailing edge type, will be considerably aft of the axis of wing tilt. The amount of spacing between these two axes of wing tilt and aileron tilt is entirely immaterial where control mechanism of the present invention is utilized.

The ailerons 14 are rotatively supported by shafts 15, disposed in axial alignment and extending spanwise through the wings. The outboard ends of these shafts are supported and journaled in the wings by bearings 16 adjacent to the wing tips, and the inboard ends of such shafts projecting into the fuselage 1 beyond the wing roots are carried by bearings 17 mounted on the swinging ends of arms 18, the opposite ends of which are anchored to the wing supporting shaft 11, such as by being welded to such shaft. While shafts 15 are free to rotate relative to the fuselage and wings, therefore, they nevertheless are supported for bodily movement in an arc about the axis of shaft 11 as the wings are tilted relative to the fuselage. Suitable arcuate slots centered on the axis of shaft 11 will be provided in the fuselage, through which shafts 15 pass to enable them to move in this fashion.

While actuating mechanisms of various types would be suitable for turning shaft 11 to alter the angle of incidence of wings 10, the actuating mechanism is illustrated as including a simple horn 2 secured to the central portion of such shaft, and a link 20 having one end pivoted to the swinging end of the horn and its other end pivoted to a nut 21, movable lengthwise of an antifriction screw 22 by rotation of such screw effected by motor 23 through suitable gearing in casing 24. The nut is guided for such travel along the screw by bosses 25 slidably received in slots 26 in the mounting 27. The free end of the screw 22, the nut carried by it, and the end of link 20 pivoted on the nut are all supported from the mounting 27 by the bosses 25 riding in slots 26, yet link 20 will be able to deflect slightly up or down as the swinging end of horn 2 moves in the arcuate path which it describes during tilting of the wings 10.

Figure 2:
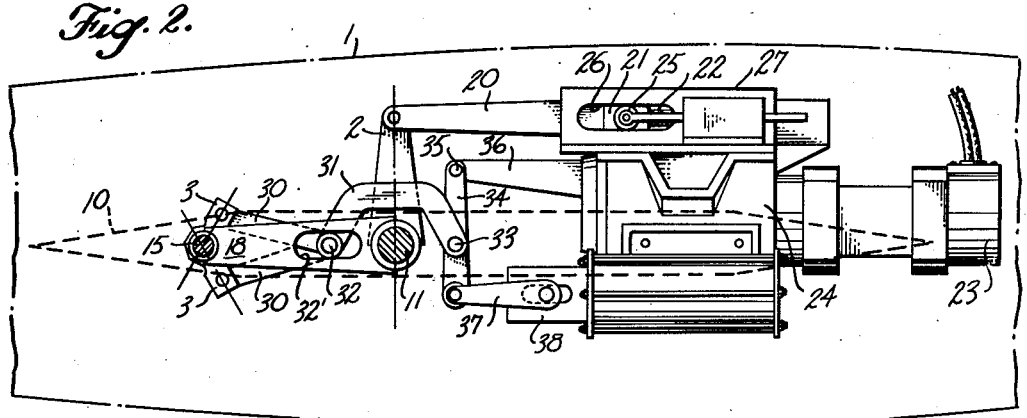
Figure 2 is a longitudinal sectional view through the aircraft showing the control mechanism in side elevation with the wing in approximately zero angle of incidence position.
Figure 3:
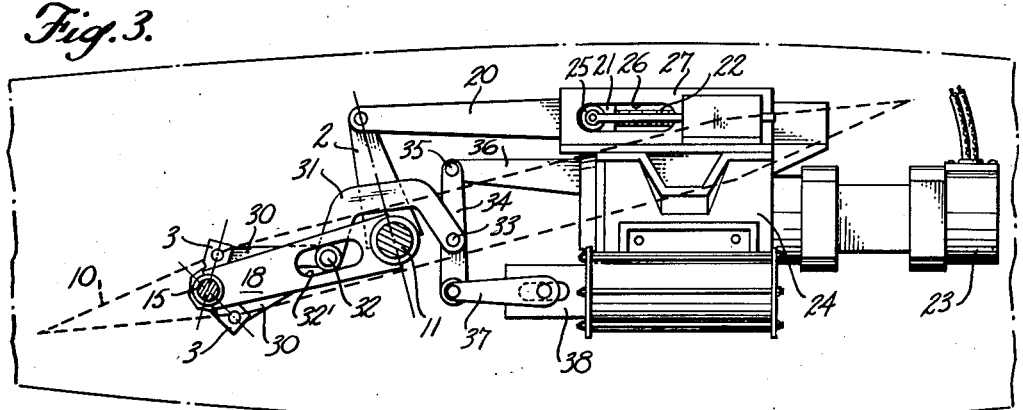
Figure 3 is a similar view showing the controls in position tilting the wing into substantially its highest angle of incidence position.

In Figure 2 the wing 10 is shown substantially in its zero angle of incidence position, whereas in Figure 3 the wing has been tilted relative to fuselage 1 into substantially its maximum angle of incidence position. During such movement the aileron control shafts 15 will have been displaced bodily downward, but it is desired that the aileron control mechanism be such as to avoid movement of the ailerons relative to the wings during such change in wing angle of incidence. This result is attained despite the avoidance of passing aileron control mechanism substantially coincident with the axis of wing supporting shaft 11 by utilizing the aileron control mechanism of the present invention.

Figure 5:
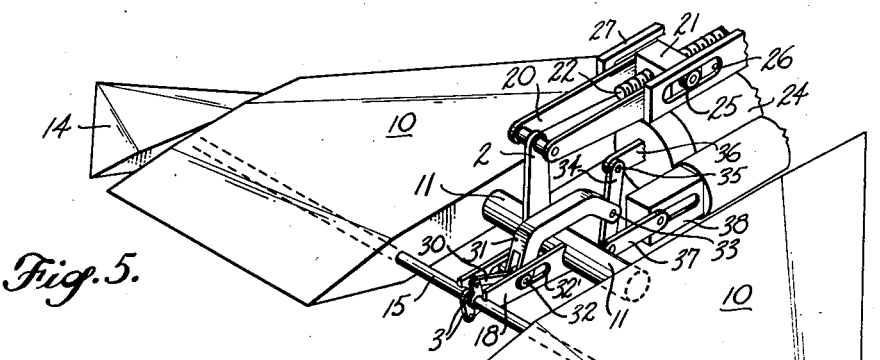
Figures 5, 6 and 7 are top perspective views of the wing, aileron and control mechanism assembly, somewhat diagrammatic in character and with parts broken away, but illustrating the wings and ailerons in various control positions.
Figure 6:
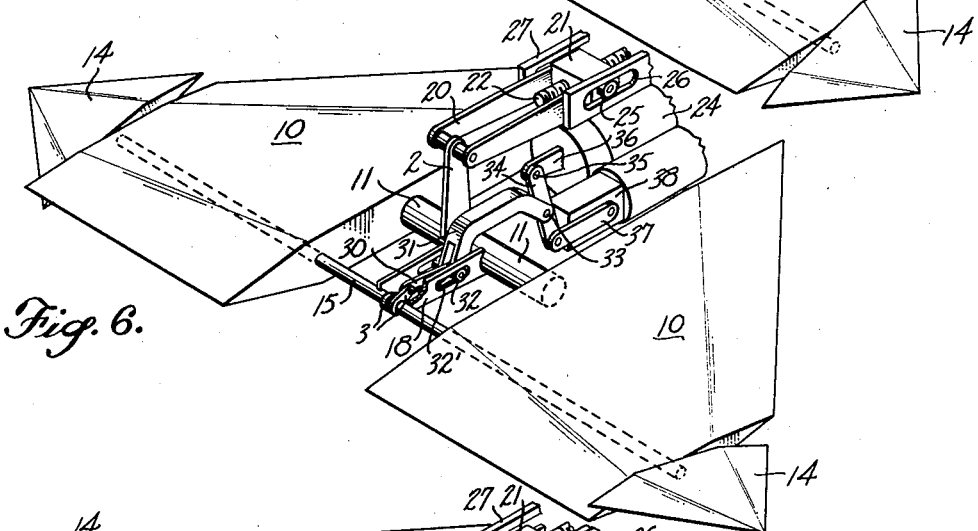
Figure 7:
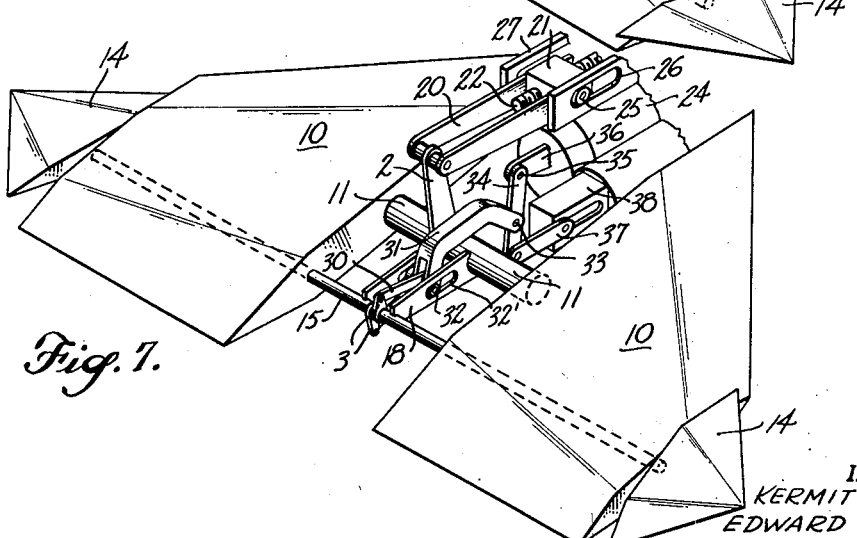

In Figure 5 the ailerons 14 are illustrated as rotated differentially relative to the wings 10 from their neutral positions of Figure 1 in a direction to roll the aircraft counterclockwise while the wings are substantially in zero angle of incidence position. In Figure 6 the ailerons are illustrated as being rotated in opposite directions relative to the wings so as to effect a clockwise roll of the aircraft while the wings remain in substantially zero incidence position. In Figure 7 the ailerons are illustrated as being rotated differentially relative to the wings 10 to effect a counterclockwise roll of the aircraft as in Figure 5, but in this instance the angle of incidence of the wings has been increased substantially to its maximum value by operation of the incidence adjusting mechanism in a manner comparable to that illustrated in Figure 3. While, as mentioned previously, adjustment of the angle of incidence of the wings does not appreciably affect the rotative position of the ailerons, it is also true that manipulation of the aileron control mechanism for effecting movement of the ailerons to roll the aircraft either clockwise or counterclockwise will be substantially the same for all angles of incidence of the wings within the range of wing adjustment.

The aileron adjusting mechanism includes horns 3 mounted respectively on the adjacent ends of shafts 15 so that they are disposed adjacent to each other. In neutral positions of the ailerons these horns will diverge at a substantial angle, such as approximately 120°, as shown best in Figures 2 and 3. To the swinging ends of these horns are pivoted links 30, the opposite ends of which are together connected to a thrust link 31. Enlarged ends of the pivot pin 32 interconnecting one end of thrust link 31 and overlapping adjacent ends of links 30 are slidably received in slots 32' formed in the arms 18 which support the inboard ends of shafts 15 from the shaft 11. The other end of thrust link 31 is located at the side of shaft 11 opposite pivot pin 32, and the body of link 31 between its ends is offset to bridge shaft 11.

The end of link 31 opposite pivot pin 32 is secured by a further pivot 33 to an actuating lever 34 having one end anchored by pivot 35 to the mounting 27, such as being supported by the arm 36. The other end of lever 34 is swung by a link 37 which has one end pivoted to a swinging portion of lever 34 and its other end secured to a reciprocating actuator which may be of the same type as the actuator for the wing incidence adjusting horn 2, namely an antifriction screw and nut. Such nut may be driven slidably within casing 38 on a rotative screw journaled for rotation but held against lengthwise movement within the casing. Such screw may be rotated by the same motor 23 as drives the wing adjusting nut 21, but the actuators for the wing and ailerons will be driven entirely independently. Thus, if the motor 23 rotates continuously, suitable clutches may be provided within the casing 24 to effect a driving connection from the motor 23 to the actuator for link 20, or to the actuator for link 37, entirely independently, so that these links may be reciprocated separately or conjointly, as may be desired.

As will be seen in Figure 3, thrust link 31 is of a shape such that it will bridge shaft 11 without interfering with such shaft even when the wing has been tilted to its position of maximum incidence, in which case pivot 32 has been lowered considerably below a line joining the axes of pivot pin 33 and shaft 11, thus drawing link 31 downward toward shaft 11. Because the axis of pivot 33 is located reasonably close to the axis of shaft 11, however, tilting of the wing from zero angle of incidence position even to its maximum positive or negative angle of incidence will not effect appreciable shifting of pivot 32 along slots 32' as long as lever 34 is not swung, and provided that the departure of the wing from zero angle of incidence does not exceed about fifteen or twenty degrees. The location of pivot 32 between shafts 11 and 15, both as designed and as may be effected by swinging of lever 34, does not have any appreciable influence on the rotation of shafts 15 which tends to result from tilting of the wings relative to the fuselage.

As indicated in Figure 5, movement of thrust link 31 toward shaft 15 effected by swinging of lever 34 toward wing interconnecting shaft 11 will increase the angle between the horns and the angle between links 30, and rotate the shafts 15 in opposite directions so as to effect differential movement of the ailerons 14 in a sense to produce a counterclockwise rolling maneuver of the aircraft. Conversely, as thrust link 31 is moved away from shafts 15 by swinging of lever 34 away from the wing shaft 11 as illustrated in Figure 6, the angle between horns 3 and that between links 30 will be decreased. The degree of reciprocation of thrust link 31 in each direction from its centered position shown in Figures 2 and 3 will be governed by the length of slots 32' because engagement of pivot 32 with the opposite ends of these slots will prevent further swinging of horns 3, and thus limit the degree of aileron movement.

Care must be taken to prevent swinging of horns 3 toward each other so far that links 30 tend to become aligned with their respective horns 3, thus converting the thrust force of links 30 almost entirely into a direct lengthwise thrust force on the horns instead of producing a sufficient component of force perpendicular to such horns to swing them easily. A given movement of pivot 32 along slots 32' away from shafts 15 will produce a greater decrease in the angular relationship between horns 3 than the increase in their angular relationship which will be produced by an equal movement of pivot 32 toward shafts 15, in each instance from neutral aileron position. Consequently, when the ailerons are neutral, pivot 32 will be located somewhat farther from the ends of slots 32' nearer shafts 15 than it will be from the ends of slots 32' farther from shafts 15. In effecting turning of shafts 15 by movement of thrust link 31 toward such shafts, it is quite satisfactory for the angle between horns 3 to increase to a straight angle and thereafter for the angle between such horns at the side of shafts 15 remote from pivot 32 to decrease. It would be feasible for the horns to project directly oppositely from shafts 15 in neutral position of the ailerons if such horns and the adjacent ends of such shafts were spaced apart lengthwise of these shafts a distance sufficient to receive the links 30 in side-by-side relationship between the horns.

Assuming that the ailerons are in neutral position and it is desired to have them remain in such position while the angle of incidence of the wings 10 is increased from the position shown in Figure 2 to that of Figure 3, lever 34 will be held stationary and the screw 22 will be rotated by appropriate control of the clutch interposed between such screw and the motor 23. The clutch will be manipulated so as to effect rotation of screw 22 in a direction to push nut 21 rearward from its position of Figure 2 toward its position shown in Figure 3. Even though such nut movement is continued until the bosses 25 reach the rearward ends of slots 26, the rearward end of link 31 will not move appreciably relative to slots 32' in links 18, and consequently aileron control horns 3 will not be swung relative to these links and the ailerons will remain unmoved relative to the wings while being displaced bodily with them. If the angle of incidence of the wings relative to the fuselage is decreased by manipulating the clutch to rotate screw 2 in the opposite direction for moving nut 21 forward, pivot 32 will be swung upward with the trailing portions of the wings, but again no appreciable movement will occur between link 31 and arms 18, so that the ailerons will remain unmoved relative to the wing.

Aileron rotating movement of link 31 in connection with the illustration of Figures 5 and 6 has been discussed above. Swinging of lever 34 when the wing incidence is other than neutral, as shown in Figure 7 for example, will accomplish substantially the same degree of aileron movement for a given lever movement as when the wings are in zero incidence angle position. Moreover, sufficient clearance is provided between shaft 11 and link 31 bridging it, so that the aileron control link can reciprocate adequately without interfering with the wing pivot shaft to effect maximum control movement of the ailerons even when the wings are in their extreme angle of incidence position.

We claim as our invention:

1. In an aircraft, a fuselage, wings projecting laterally oppositely from said fuselage, means supporting and guiding said wings for tilting relative to said fuselage about an axis disposed transversely of the direction of flight into different incidence angle positions, ailerons carried by said wings, respectively, and swingable relative thereto, rod means parallel to but offset from such axis about which said wings tilt, means interconnecting said rod means and said ailerons to effect movement of said ailerons by turning of said rod means, wing incidence angle control means carried by said fuselage and operable to alter the angle of incidence of said wings without swinging said ailerons relative to said wings, and aileron control means carried by said fuselage, connected to said rod means and operable to turn the same for swinging said ailerons relative to said wings in various incidence angle positions of said wings.

2. In an aircraft, a fuselage, wings projecting laterally oppositely from said fuselage, a wing shaft extending transversely of the direction of flight, carried by said fuselage and supporting and guiding said wings for tilting about the axis of said shaft into different incidence angle positions, ailerons carried by said wings, respectively, and swingable relative thereto, an aileron shaft for each aileron, connected to its aileron, carried by a wing and extending spanwise of such wing from its aileron to said fuselage, spaced aft of said wing shaft and swingable about said wing shaft by tilting of said wing, wing incidence angle control means carried by said fuselage and operable to rotate said wing shaft, thereby to alter the angle of incidence of said wings and to move said aileron shafts arcuately about the axis of said wing shaft, aileron control means carried by said fuselge forward of said wing shaft, and means interconnecting sid aileron control means and said aileron shafts, bridging said wing shaft, operable to effect differential rotation of said aileron shafts and swingable with said aileron shafts during wing incidence angle altering rotation of said wing shaft without effecting appreciable rotation of said aileron shafts relative to said wings.

3. In an aircraft, a fuselage, wings projecting laterally oppositely from said fuselage, a wing shaft extending transversely of the direction of flight, carried by said fuselage and supporting and guiding said wings for tilting about the axis of said shaft into different incidence angle positions, ailerons carried by said wings, respectively, and swingable relative thereto, an aileron shaft for each aileron, connected to its aileron, carried by a wing and extending spanwise of such wing from its aileron to said fuselage, spaced aft of said wing shaft and swingable about said wing shaft by tilting of said wing, wing incidence angle control means carried by said fuselage and operable to rotate said wing shaft, thereby to alter the angle of incidence of said wings and to move said aileron shafts arcuately about the axis of said wing shaft, aileron control means carried by said fuselage forward of said wing shaft, and means interconnecting said aileron control means and said aileron shafts including a link bridging said wing shaft, reciprocable to effect differential rotation of said aileron shafts and swingable with said aileron shafts during wing incidence angle altering rotation of said wing shaft without effecting appreciable rotation of said aileron shafts relative to said wings.

4. In an aircraft, a fuselage, wings projecting laterally oppositely from said fuselage, means supporting and guiding said wings for tilting relative to said fuselage about an axis disposed transversely of the direction of flight into different incidence angle positions, ailerons carried by said wings, respectively, and swingable relative thereto about an axis offset rearwardly from such wing tilting axis, rod means aligned with the axis of tilt of said ailerons and carried by and extending between said wings, means interconnecting said rod means and said ailerons to effect movement of said ailerons by turning of said rod means, wing incidence angle control means carried by said fuselage and operable to alter the angle of incidence of said wings without swinging said ailerons relative to said wings, aileron control means connected to said rod means and operable to turn the same for swinging said ailerons relative to said wings, and means supporting said aileron control means in part from said wing supporting and guiding means and operable to swing with said rod means the portion of said aileron control means thus supported as said wings are tilted to prevent turning of said rod means relative to said wings by operation of said wing incidence angle control means.

5. In an aircraft, a fuselage, wings projecting laterally oppositely from said fuselage, means supporting and guiding said wings for tilting relative to said fuselage about an axis disposed transversely of the direction of flight into different incidence angle positions, ailerons carried by said wings respectively, and swingable relative thereto, an aileron shaft for each aileron, connected to its aileron, extending spanwise of a wing from its aileron into said fuselage and spaced longitudinally of the aircraft from the wing tilting axis, wing incidence angle control means carried by said fuselage and operable to alter the angle of incidence of said wings without swinging said ailerons relative to said wings, means supporting from said wing supporting and guiding means the ends of said aileron shafts inboard of said wings, and aileron control means operable to rotate said aileron shafts relative to said wings in various incidence angle positions of said wings, thereby to swing said ailerons relative to said wings.

6. In an aircraft, a fuselage, wings projecting laterally oppositely from said fuselage, a wing shaft extending transversely of the direction of flight, carried by said fuselage and supporting and guiding said wings for tilting relative to said fuselage about an axis disposed transversely of the direction of flight into different incidence angle positions, ailerons carried by said wings, respectively, and swingable relative thereto, an aileron shaft for each aileron, connected to its aileron, extending spanwise of a wing from its aileron into said fuselage and spaced longitudinally of the aircraft from the wing tilting axis, wing incidence angle control means carried by said fuselage and operable to alter the angle of incidence of said wings without swinging said ailerons relative to said wings, arms carried by said wing shaft and supporting said aileron shafts inboard of said wings, and aileron control means operable to rotate said aileron shafts relative to said wings in various incidence angle positions of said wings, thereby to swing said ailerons relative to said wings.

7. In an aircraft, a fuselage, wings projecting laterally oppositely from said fuselage, a wing shaft extending transversely of the direction of flight, carried by said fuselage and supporting and guiding said wings for tilting relative to said fuselage about an axis disposed transversely of the direction of flight into different incidence angle positions, ailerons carried by said wings, respectively, and swingable relative thereto, an aileron shaft for each aileron, connected to its aileron, extending spanwise of a wing from its aileron into said fuselage and spaced longitudinally of the aircraft from the wing tilting axis, wing incidence angle control means carried by said fuselage and operable to alter the angle of incidence of said wings without swinging said ailerons relative to said wings, arms carried by said wing shaft and supporting said aileron shafts inboard of said wings, and aileron control linkage means disposed between said arms, bridging said wing shaft and operable to rotate said aileron shafts relative to said wings in various incidence angle positions of said wings, thereby to swing said ailerons relative to said wings.

8. In an aircraft, a fuselage, wings projecting laterally oppositely from said fuselage, means supporting and guiding said wings for tilting relative to said fuselage about an axis disposed transveresly of the direction of flight into different incidence angle positions, ailerons carried by said wings, respectively, and swingable relative thereto, an aileron shaft for each aileron, connected to its aileron, carried by a wing and extending spanwise of such wing from its aileron to said fuselage, and swingable about said wing shaft by tilting of said wing, wing incidence angle control means carried by said fuselage and operable to alter the angle of incidence of said wings without swinging said ailerons relative to said wings, and aileron control means carried by said fuselage, connected to said aileron shafts and operable to effect differential rotation of said aileron shafts and swing said ailerons differentially relative to said wings in various incidence angle positions of said wings.

9. In an aircraft, a fuselage, wings projecting laterally oppositely from said fuselage, means supporting and guiding said wings for tilting relative to said fuselage about an axis disposed transversely of the direction of flight into different incidence angle positions, ailerons carried by said swings, respectively, and swingable relative thereto, an aileron shaft for each aileron, connected to its aileron, spaced longitudinally of the aircraft from said wing tilt axis, extending spanwise of a wing from its aileron to said fuselage and swingable about said wing shaft by tilting of said wing, wing incidence angle control means carried by said fuselage and operable to alter the angle of incidence of said wings without swinging said ailerons relative to said wings, and aileron control means carried by said fuselage, connected to said aileron shafts and operable to effect differential rotation of said aileron shafts and swing said ailerons differentially relative to said wings in various incidence angle positions of said wings.

10. In the combination defined in claim 9, the aileron control means including horns projecting oppositely from the aileron shafts, and linkage means reciprocable in one direction to swing said horns conjointly toward each other to effect differential rotation of the aileron shafts.

11. The combination defined in claim 10, in which the means supporting and guiding the wings for tilting includes a wing shaft connecting the wings and bridged by the linkage means, and means located at the side of said wing shaft remote from the aileron shafts and operable to effect reciprocation of such linkage means.

References Cited in the file of this patent

UNITED STATES PATENTS

| | | |
|---|---|---|
| 1,757,202 | Lamb | May 6, 1930 |
| 1,791,182 | Woodruff | Feb. 3, 1931 |
| 1,856,093 | Ford et al. | May 3, 1932 |
| 2,702,172 | Focke | Feb. 15, 1955 |